INVENTOR.
JACKSON M. LUKER

Patented Nov. 4, 1947

2,430,132

UNITED STATES PATENT OFFICE 2,430,132

BRUSHING MECHANISM FOR CLEANING TUBULAR PANS

Jackson M. Luker, Champaign County, Ill.

Application November 27, 1944, Serial No. 565,263

5 Claims. (Cl. 15—56)

This invention relates to pan cleaning devices, and more particularly to a device for cleaning tubular pans of the type in which angel food cakes are baked.

An object of the invention is to provide a high speed, brush type cleaner, for tubular cake pans.

Another object of the invention is to provide a cleaning device which will simultaneously clean the inner and outer walls of a tubular cake pan.

Still another object of the invention is to provide a brush type tubular cake pan cleaner which is so constructed that wear on the brush is automatically compensated for by reason of the shape of the individual brushes, and the arrangement of the brushes relative to each other.

A further object is to provide a device of the class described which can be maintained in a clean sanitary condition with a minimum of effort.

Another object of the invention is to provide a pan cleaning device having an upper and a lower battery of rotatable brushes, and wherein the brushes of each battery are independently driven.

Still another object of the invention is to provide a pan cleaning device having an upper and a lower battery of rotatable brushes, wherein the lower battery is fixed, whereas the upper battery is movable vertically toward and away from the lower battery, and wherein the driving means for the brushes of the lower battery is correlated relative to the spacing of said batteries whereby the brushes of the upper battery are rotated only when they are in a lowered, pan-engaging position.

A further object of the invention is to provide an efficient, structurally strong, yet mechanically simple device having the herein above-described characteristics.

These and other objects may be attained by the means described herein, and as disclosed in the accompanying drawings, in which.

The baking industry has experienced considerable difficulty in cleaning pans in which angel food cake has been baked. The sugar ingredient of angel food cake batter forms a gummy deposit on the side and bottom walls of the cake pan which is very difficult to remove.

The present device has been designed primarily, though not exclusively, for the purpose of cleaning this residue from the tubular pans in which angel food cakes are baked.

Figure 1:
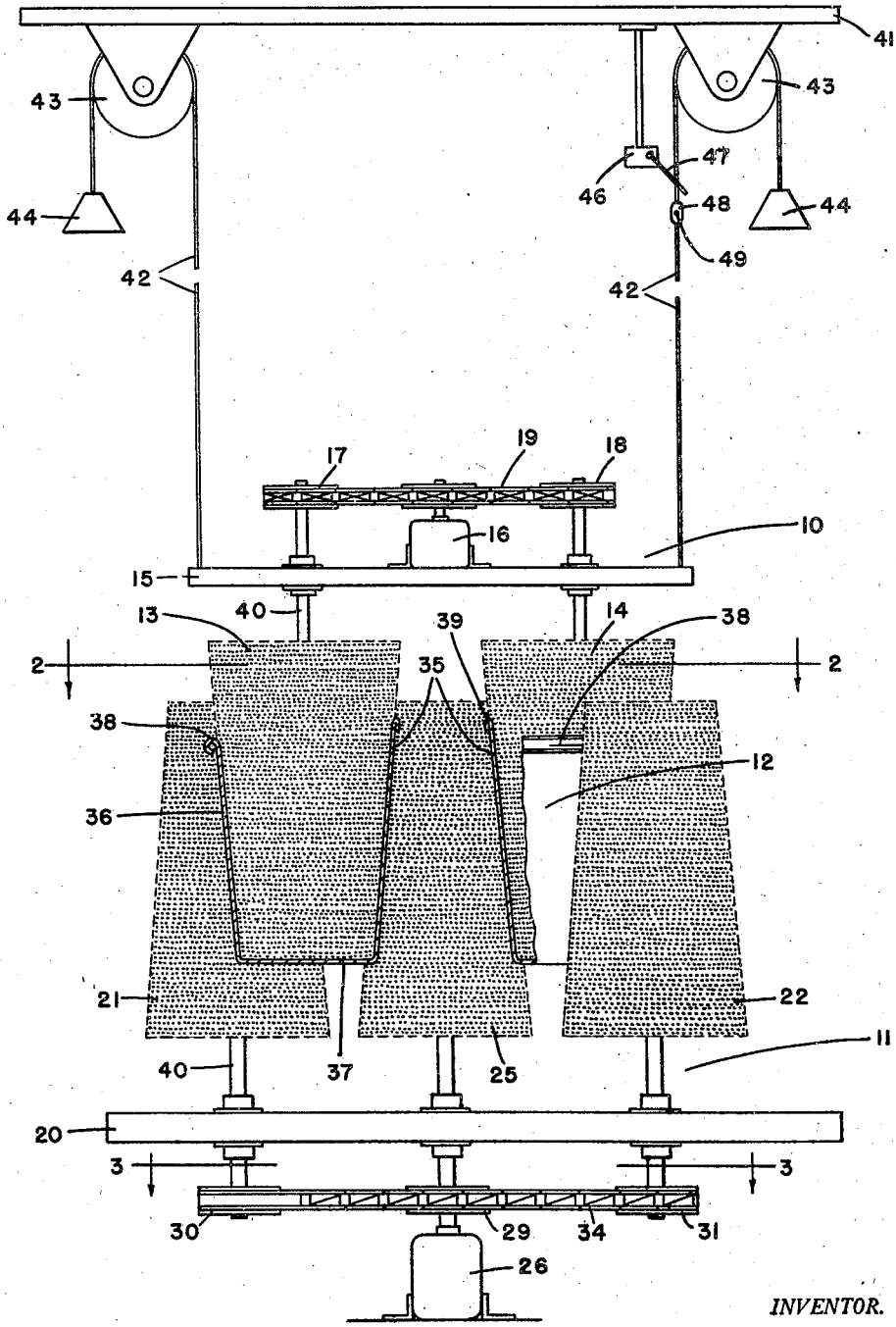
Fig. 1 is a side view of the device comprising my invention, partly in section for clarity of detail and understanding, showing a tubular cake pan in the process of being cleaned.

With reference to Fig. 1 the device comprises, broadly speaking, an upper, vertically shiftable battery 10 and a lower, fixed battery 11, between which a tubular cake pan 12 is adapted to be disposed for cleaning.

The upper battery includes a pair of brushes 13 and 14 each of which is rotatably journaled to a suitable support member 15. If desired, brush driving means, such as an electric motor 16, may be secured to and carried by support member 15, said motor being operatively connected to sprockets 17 and 18 by a chain, or the like, 19.

The lower battery 11 comprises a lower support member 20 and a plurality of brushes 21, 22, 23, 24, and 25, each of which is rotatively journaled to the support member, and each of which is adapted to be rotated in the same direction by means of a driving motor 26 through gears 27, 28, sprocket gear 29, sprockets 30, 31, 32, 33, and chain 34.

Figure 2:
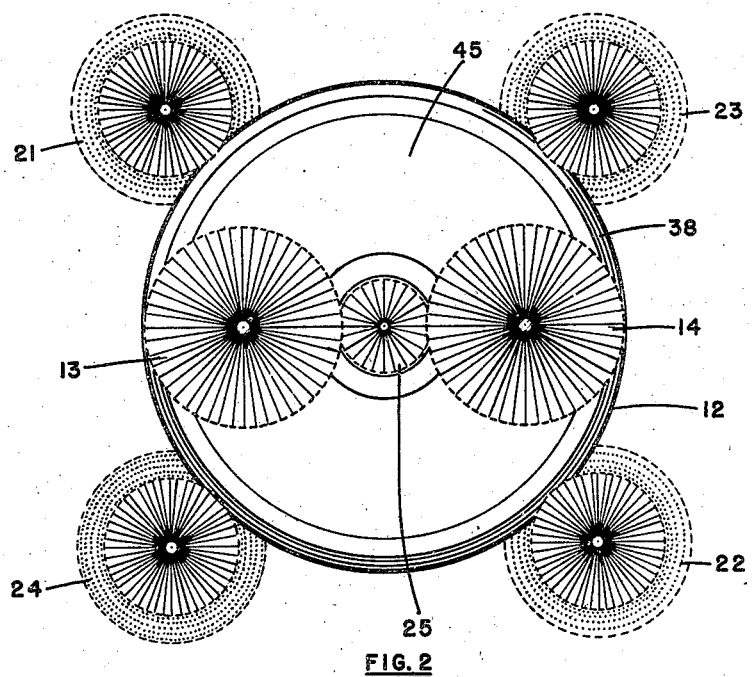
Fig. 2 is a view taken on line 2—2 of Fig. 1.
Figure 3:
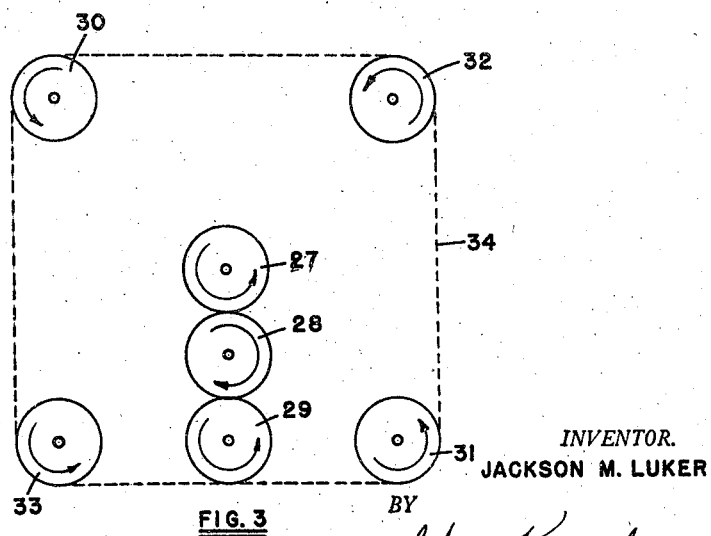
Fig. 3 is a schematic view taken on line 3—3 of Fig. 1.

As best disclosed in Figures 1 and 2, it will be observed that each of the various brushes is in the shape of a truncated cone. Brushes 13 and 14 are of such dimensions as to substantially fill the annular batter receptive opening, or housing, 45 defined by inside tubular walls 35, outside walls 36, and bottom wall 37. Brushes 21, 22, 23, and 24 are adapted to engage the outer face of outer walls 36 and to overlappingly engage the outer perimeter of bottom wall 37 and the upper perimeter of the annular bead 38 which circumscribes the upper edge of outer walls 36. Brush 25 is adapted to be received within, that is it extends upwardly into and through the inside of tubular walls 35. This brush overlappingly engages the inner periphery of bottom wall 37 and the top of the upper inturned bead 39 which circumscribes the top of tubular walls 35.

The physical characteristics of the brushes are such that they will efficiently and effectively remove the cake residue by a scrubbing or abrading action. If desired the brushes may be provided with bristles made from any of the well-known bristle substitutes or from animal hair bristles. The present invention is not concerned with the particular manner in which the bristles are secured to the brush shafts 40. The truncated conical shape of the brushes will automatically compensate for wear, since the tapered shape of each brush will assure positive contact with the adjacent faces of a tubular cake pan, as disclosed in Fig. 1.

In the preferred embodiment of the invention, support member 20 is mounted against vertical movement, whereas support member 15 is mounted for movement toward and away from fixed support member 20. If desired, upper support member 15 may be suitably suspended from a superstructure, denoted generally by the numeral 41, by means of connector members 42, which may pass over pulleys 43, and terminate in counterweights 44. The purpose of the counterweights is to support and maintain the upper battery in any position relative to the lower battery.

In operation, a tubular cake pan 12, which has previously been thoroughly soaked in a proper solution, is lowered onto, or nested in, brushes 21 to 25 inclusive, whereby to be supported by these five brushes. During this pan placing or nesting operation the upper battery will, of necessity, be elevated by an amount to permit the lower ends of brushes 13 and 14 to clear the upper rims of the pan. After the pan has thus been nested on the brushes of the lower battery, the upper battery may be lowered toward the lower battery for the purpose of introducing brushes 13 and 14 into the annular batter receptive housing 45. Downward movement of the upper battery is continued until brushes 13 and 14 substantially engage the entire batter receptive opening, as indicated in Fig. 1. As brushes 13 and 14 are thus forced into housing 45, the pan is forced downwardly further onto brushes 21 to 25 inclusive.

Excellent results have been obtained when the brushes of the lower battery are rotated in one direction and the brushes of the upper battery are rotated in the opposite direction. Likewise, the brushes of the lower battery may be continuously rotated, whereby to facilitate insertion and removal of a pan.

In the preferred embodiment of the invention the brushes of the upper battery are rotated only during those periods of time when they are ready to engage housing 45. The operating characteristics of brushes 13 and 14 may be expeditiously controlled by means of an electrical switching device which may comprise an electrical switch 46 having an actuator arm 47 which is adapted to engage a stop member 48 secured to and carried by a connector member 42. In the device disclosed in Fig. 1, actuator arm 47 is in a circuit-making position, brushes 13 and 14 engaging pan 12. Upward motion of the upper battery will cause stop member 48 to lift actuator arm 47 upwardly to a circuit-breaking position. Switch 46 is, of course, in series with electric motor 16 for controlling its operation. Stop member 48 may be slidably secured to connector member 42, being fixed thereto by means of a set screw, or the like, 49. In this manner the time at which brushes 13 and 14 are rotated may be adjusted to meet the particular conditions existing in the bakery.

It will be observed that the pan to be cleaned does not rest upon a solid surface, or base plate, but in contrast thereto, the pan is supported solely by reason of its frictional engagement with the brushes of the lower battery.

It should be understood that various changes and modifications in the structural details of the device may be made, within the scope of the appended claims, without departing from the spirit of the invention.

What is claimed is:

1. A device for cleaning tubular pans, comprising, in combination, a battery of rotatable brushes arranged to engage the outer faces of the outer wall of a tubular pan and a single brush arranged to project into and extend upwardly through the inner tubular wall of the pan, said brushes having a length substantially greater than the overall height of the pan walls which they engage and said brushes being in the shape of a truncated cone having a diameter of such dimension to overlappingly engage the upper and lower edges of the pan, means for rotating said brushes in the same direction, a second battery of rotatable brushes arranged to engage the inner faces of the inner and outer walls and the inner face of the bottom wall of the pan, the brushes of said second battery having a length substantially greater than the depth of the batter receptive housing defined by the bottom, inner and outer walls and said brushes of said second battery being in the shape of a truncated cone and having a diameter of such proportions as to overlappingly engage the upper edges of the inner and outer walls, means for supporting said second battery for movement toward and from said first battery, and means for rotating the brushes of the second battery.

2. In a device for cleaning tubular pans, a pair of vertically aligned laterally spaced support members, a central rotatable brush and a plurality of other rotatable brushes spaced from and disposed radially about said central brush, each of said brushes being secured to and carried by one of said support members, a plurality of rotatable brushes secured to and carried by the other support member and extending toward the brushes of said first support member and being spaced radially from and disposed between said central brush and the other brushes carried by said first support member, means for imparting a rotary motion to the various brushes, and means for varying the lateral distance between said support members.

3. In a device for cleaning tubular pans, a fixed support member, a central rotatable brush and a plurality of other rotatable brushes spaced from and disposed radially about said central brush, each of said brushes being secured to and carried by said fixed support member, a second support member mounted above and movable toward and away from said fixed support member, a plurality of rotatable brushes secured to and carried by said second support member and projecting therefrom toward the brushes of said fixed support member, the brushes of said second support member disposed radially about the central brush of said fixed support member and between said central brush and the other brushes of said fixed support member, means for imparting a rotary motion to the brushes of said fixed support member, other means for imparting a rotary motion to the brushes of said second or movable support member, and means for controlling the operating characteristics of said last mentioned means for imparting a rotary motion to the brushes of said movable support member only when said brushes have been lowered to nesting relationship relative to the brushes of said fixed support member.

4. In a cleaning apparatus for tubular pans of the type characterized by an annular batter receptive housing defined by an annular outer wall, a bottom, and an upstanding hollow tubular inner wall, of a fixed support member, a central rotatable brush and a plurality of other rotatable brushes spaced from and disposed radially about said central brush, each of said brushes being secured to and carried by said fixed support member, the brushes disposed radially about said central brush positioned to nestingly receive and wholly support the outer face of the outer annular wall and bottom of a tubular type pan, said central brush positioned to project upwardly into and extend through the central hollow tubular inner wall of the pan, a second support member mounted above and movable toward and away from said fixed support member, a plurality of rotatable brushes secured to and carried by said second support member and projecting downwardly therefrom toward the brushes of the fixed support member, the brushes of said second support member disposed radially about the central brush and between said central brush and the other brushes of said fixed support member, the brushes of said second support member positioned to extend into the annular batter receptive housing of a tubular pan nested in the brushes of said fixed support member for engaging the inner face of the walls defining said housing and for forcing said pan deeper into the brushes of said fixed support member, and means for imparting a rotary motion to said various brushes.

5. In a cleaning apparatus for tubular pans of the type characterized by an annular batter receptive housing defined by an annular outer wall, a bottom, and an upstanding hollow tubular inner wall, of a fixed support member, a central rotatable brush and a plurality of other rotatable brushes spaced from and disposed radially about said central brush, each of said brushes being secured to and carried by said fixed support member, the brushes disposed radially about said central brush positioned to nestingly receive and wholly support the outer face of the outer annular wall and bottom of a tubular type pan, said central brush positioned to project upwardly into and extend through the central hollow tubular inner wall of the pan, a second support member mounted above and movable toward and away from said fixed support member, a plurality of rotatable brushes secured to and carried by said second support member and projecting downwardly therefrom toward the brushes of the fixed support member, the brushes of said support member disposed radially about the central brush and between said central brush and the other brushes of said fixed support member, the brushes of said second support member positioned to extend into the annular batter receptive housing of a tubular pan nested in the brushes of said fixed support member for engaging the inner face of the walls defining said housing and for forcing said pan deeper into the brushes of said fixed support member, means for imparting a rotary motion to the brushes of said fixed member, means for imparting a rotary motion to the brushes of said second support member, and means for controlling the operating characteristics of said last mentioned means for imparting a rotary motion to the brushes of said second support member only when said brushes have been lowered into the batter receptive housing of a tubular pan nested in the brushes of said fixed support member.

JACKSON M. LUKER.

REFERENCES CITED

The following references are of record in the file of this patent:

UNITED STATES PATENTS

| Number | Name | Date |
| --- | --- | --- |
| 1,622,130 | Boyd | Mar. 22, 1927 |
| 1,971,206 | Adelmann | Aug. 21, 1934 |
| 2,274,309 | Velton | Feb. 24, 1942 |
| 2,239,047 | Mathiessen | Apr. 22, 1941 |

FOREIGN PATENTS

| Number | Country | Date |
| --- | --- | --- |
| 352,886 | Great Britain | July 16, 1931 |